(12) United States Patent
Park et al.

(10) Patent No.: US 9,018,906 B2
(45) Date of Patent: Apr. 28, 2015

(54) BATTERY PACK

(75) Inventors: Seok-Ryun Park, Yongin-si (KR); Seok Koh, Yongin-si (KR); Kyung-Ho Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 557 days.

(21) Appl. No.: 13/353,783

(22) Filed: Jan. 19, 2012

(65) Prior Publication Data

US 2013/0062952 A1     Mar. 14, 2013

Related U.S. Application Data

(60) Provisional application No. 61/532,910, filed on Sep. 9, 2011.

(51) Int. Cl.
*H02J 7/00* (2006.01)
*H02J 1/00* (2006.01)
*H01M 10/42* (2006.01)

(52) U.S. Cl.
CPC ...... *H01M 10/4257* (2013.01); *H01M 10/4264* (2013.01); *H01M 2010/4271* (2013.01); *H01M 2220/30* (2013.01)

(58) Field of Classification Search
CPC .......................... H02J 7/0024; H01M 10/4257
USPC ............................. 320/117, 134; 307/71, 85
See application file for complete search history.

(56) References Cited

U.S. PATENT DOCUMENTS

| 3,718,848 A | 2/1973 | Hines |
| 3,886,426 A | 5/1975 | Daggett |
| 4,139,812 A | 2/1979 | Huggins |
| 4,297,629 A | 10/1981 | Godard et al. |
| 5,121,046 A | 6/1992 | McCullough |
| 5,349,282 A * | 9/1994 | McClure ...................... 320/136 |
| 5,461,264 A | 10/1995 | Yang |
| 5,489,834 A * | 2/1996 | Pitkanen ...................... 320/106 |
| 5,563,496 A * | 10/1996 | McClure ...................... 320/128 |

(Continued)

FOREIGN PATENT DOCUMENTS

| JP | 2001-186668 A | 7/2001 |
| JP | 2011-108372 A | 6/2011 |

(Continued)

OTHER PUBLICATIONS

Korean Office Action issued by Korean Patent Office on Jul. 22, 2013 corresponding to 10-2012-0088642 and Request for Entry of the Accompanying Office Action attached herewith.

(Continued)

*Primary Examiner* — M'Baye Diao
(74) *Attorney, Agent, or Firm* — Robert E. Bushnell, Esq.

(57) ABSTRACT

The battery pack that recognizes operation voltage of a corresponding device according to a unique resistance of the connected device and sensed through a third external terminal of the battery pack, the battery pack having a plurality of cells that can be coupled in series or in parallel to be suitable for an operation voltage of the corresponding device. The battery pack can be sold to a consumer to enable the consumer to power a variety of different electrical appliances. Alternatively, the battery pack can be incorporated into a chassis of an electrical apparatus so that the battery pack can be sold to many different manufacturers of electrical appliances.

20 Claims, 5 Drawing Sheets

(56) References Cited

U.S. PATENT DOCUMENTS

| | | | |
|---|---|---|---|
| 5,666,006 A * | 9/1997 | Townsley et al. | 307/66 |
| 5,738,919 A * | 4/1998 | Thomas et al. | 429/3 |
| 5,786,682 A * | 7/1998 | Aiken et al. | 320/136 |
| 5,801,514 A * | 9/1998 | Saeki et al. | 320/136 |
| 5,825,155 A * | 10/1998 | Ito et al. | 320/118 |
| 5,835,989 A * | 11/1998 | Nagai | 307/116 |
| 5,945,803 A * | 8/1999 | Brotto et al. | 320/106 |
| 5,999,056 A * | 12/1999 | Fong | 330/278 |
| 6,025,694 A * | 2/2000 | Mercke et al. | 320/106 |
| 6,064,179 A * | 5/2000 | Ito et al. | 320/128 |
| 6,140,799 A | 10/2000 | Thomasson | |
| 6,268,711 B1 | 7/2001 | Bearfield | |
| 6,326,768 B2 | 12/2001 | Nagai et al. | |
| 6,430,692 B1 | 8/2002 | Kimble et al. | |
| 6,727,710 B1 * | 4/2004 | de Jong et al. | 324/719 |
| 6,955,859 B2 * | 10/2005 | Kimura et al. | 429/7 |
| 7,075,194 B2 | 7/2006 | Weidenheimer et al. | |
| 7,560,829 B2 * | 7/2009 | Proefrock et al. | 307/18 |
| 7,567,057 B2 * | 7/2009 | Elder et al. | 320/104 |
| 7,629,771 B2 * | 12/2009 | Li et al. | 320/134 |
| 7,688,028 B2 * | 3/2010 | Phillips et al. | 320/114 |
| 8,294,424 B2 * | 10/2012 | Bucur | 320/116 |
| 8,384,349 B2 * | 2/2013 | Suzuki et al. | 320/112 |
| 2003/0071523 A1 | 4/2003 | Silverman | |
| 2007/0062744 A1 | 3/2007 | Weidenheimer et al. | |
| 2007/0188950 A1 * | 8/2007 | Liu et al. | 361/54 |
| 2008/0180061 A1 * | 7/2008 | Koski et al. | 320/117 |
| 2009/0042073 A1 | 2/2009 | Kim et al. | |
| 2009/0085515 A1 * | 4/2009 | Bourilkov et al. | 320/117 |
| 2009/0085553 A1 | 4/2009 | Kumar et al. | |
| 2010/0141207 A1 * | 6/2010 | Phillips et al. | 320/114 |
| 2010/0213898 A1 | 8/2010 | Hayashigawa | |
| 2011/0001456 A1 | 1/2011 | Wang | |
| 2011/0056177 A1 * | 3/2011 | Goto | 56/14.7 |
| 2011/0156650 A1 * | 6/2011 | Yang et al. | 320/118 |

FOREIGN PATENT DOCUMENTS

| | | |
|---|---|---|
| KR | 1020050056291 A | 6/2005 |
| KR | 1020070076627 A | 7/2007 |
| KR | 10-2008-0019447 A | 3/2008 |
| KR | 10-2009-0014619 A | 2/2009 |

OTHER PUBLICATIONS

Extended European Search Report dated Nov. 29, 2012 in connection with European Patent Application No. 12159610 and Request for Entry of the Accompanying Search Report attached herewith.
European Office Action issued on Aug. 7, 2014 by EPO in connection with corresponding European Patent Application No. 12159610.

* cited by examiner

FIG. 4

| Cell 1 & Cell 2 | T1 | T2 | T3 |
|---|---|---|---|
| in series | OFF | ON | OFF |
| in parallel | ON | OFF | ON |

BATTERY PACK

CLAIM OF PRIORITY

This application makes reference to, incorporates the same herein, and claims all benefits accruing under 35 U.S.C. §119 from an application for BATTERY PACK earlier filed in the United States Patent and Trademark Office on 9 Sep. 2011 and there duly assigned Ser. No. 61/532,910.

BACKGROUND OF THE INVENTION

1. Field of the Invention

The present invention relates to a battery pack with a charge and discharge voltage level that changes according to a connected device, an electrical apparatus that includes the battery pack and a battery pack arrangement that includes the battery pack.

2. Description of the Related Art

Recently, usage of portable devices such as mobile phones, PDAs (personal digital assistants), netbooks, laptops, etc. has increased. The portable device is supplied with power by using a rechargeable battery pack including a rechargeable battery that can be repeatedly charged and discharged. The rechargeable battery may be a nickel-cadmium battery, a lead-acid battery, a nickel metal hydride battery, a lithium ion battery, and a lithium polymer battery, which are all commercially available. In the lithium-ion battery, a memory effect is not generated, charge and discharge are free, a self discharge ratio is low, and energy density is high such that the lithium-ion battery is advantageous in aspects of reduced size and weight, and is thereby being widely used.

In general, battery packs of the portable devices are manufactured with different shapes and battery configurations according to a shape of the used device and an operation voltage. Accordingly, the battery pack of an arbitrary device is not used for a different device. This compatibility problem of the battery pack in which a battery pack that may be available cannot be used with other devices generates a waste of resources. Research on a battery pack that may be adaptively used for many different devices is required. The above information disclosed in this Background section is only for enhancement of understanding of the background of the invention and therefore it may contain information that does not form the prior art as per 35 U.S.C. 102.

What is needed is a battery pack having an extra terminal to sense a voltage needed by a connected electrical appliance and to rearrange the batteries within the battery pack according to the voltage needed by the connected electrical appliance.

SUMMARY OF THE INVENTION

The present invention provides a battery pack that is capable of changing a voltage level of charge and discharge according to a connected device, an electronic apparatus that includes the battery pack and a battery pack arrangement that includes the battery pack. The battery pack recognizes an operation voltage of a corresponding device according to a unique resistance of a connected device sensed through a unique resistance terminal of the battery pack, and couples a plurality of cells in series or in parallel in response to the recognized operation voltage of the corresponding device. As a result, a common battery pack that is capable of being used for various devices using voltages of different levels may be provided, compatibility of the common battery pack is ensured, thereby reducing resource waste. The battery pack can be sold separately to consumers to use with a variety of electrical apparatuses or to original equipment manufacturers (OEMs) for use within a chassis of a variety of electronic apparatuses to power a corresponding variety of electrical appliances.

According to one aspect of the present invention, there is provided a battery pack arrangement, including a battery pack and an electrical appliance powered by the battery pack and being connected to the battery pack via positive, negative and unique resistance terminals on the battery pack, the battery pack including a battery part including a plurality of battery cells and a plurality of switches, the plurality of switches to vary an output voltage applied to the electrical appliance across the positive and negative terminals and a control part connected to the battery part and to the electrical appliance, the control part to determine the output voltage used by the electrical appliance based on an unique resistance voltage of the unique resistance terminal and to electrically connect the plurality of battery cells in parallel or in series by controlling the switches based on the unique resistance voltage.

Each of the switches may be transistors, the control part connecting the battery cells in series or in parallel by sending control signals sent to each of the transistors. Each of the transistors may be field effect transistors, the control signals may be sent to the gates of each of the transistors. The battery part may be composed of two battery cells and three switches. Each of the two battery cells may be electrically isolated from each other by at least one of the capacitors. The control part may include a control unit connected to each of the three switches to control each of the three switches. The control unit may also be connected between a positive terminal of a first battery cell and a negative terminal of a second battery cell. The control part may include a switch unit to selectively connect the battery part to the negative terminal based on whether or not the battery part is overcharged or overdischarged. The electrical appliance may be one of a charging device and an electrical apparatus powered by the battery pack. The control part may include a switch unit that disconnects the negative terminal from the battery part when an output voltage of the battery part is less than a discharge reference voltage during a discharging operation or when the output voltage of the battery part is greater than a charging reference voltage during a charging operation.

According to another aspect of the present invention, there is provided a battery pack that includes a positive output terminal, a negative output terminal and an unique resistance terminal exposed to an outside, a battery part including a plurality of battery cells and a plurality of switches and a control part connected to the battery part to electrically connect the plurality of battery cells in parallel or in series by controlling the switches based upon a unique resistance voltage sensed at the unique resistance terminal. The plurality of the switches may include a first transistor connected between a positive terminal of a first battery cell and a positive terminal of a second battery cell, a second transistor connected between a negative terminal of the first battery cell and the positive terminal of the second battery cell and a third transistor connected between the negative terminal of the first battery cell and a negative terminal of the second battery cell. The battery back may also include a capacitor arranged in parallel with one of the switches and connected between a negative terminal of one of the battery cells and a positive terminal of another of the battery cells. The battery pack may also include a capacitor connected between a positive terminal of a one of the battery cells and a negative terminal of another of the battery cells. The battery pack may also include a capacitor connected between the battery part and the negative output terminal.

According to yet another aspect of the present invention, there is provided an electronic apparatus that includes a chassis, an electrical appliance arranged within the chassis, a battery pack arranged within the chassis, the electrical appliance being connected to the battery pack via a positive output terminal, a negative output terminal and an unique resistance terminal arranged on the battery pack, the battery pack including a battery part including a plurality of battery cells and a plurality of switches and a control part connected to the battery part to electrically connect the plurality of battery cells in parallel or in series by controlling the switches based upon a unique resistance voltage sensed by the unique resistance terminal. The electrical appliance may be powered by the battery pack. The plurality of batteries may be composed of a first battery cell and a second battery cell, the plurality of switches being composed of a first switch, a second switch and a third switch. The plurality of the switches may include a first transistor connected between a positive terminal of a first battery cell and a positive terminal of a second battery cell, a second transistor connected between a negative terminal of the first battery cell and the positive terminal of the second battery cell and a third transistor connected between the negative terminal of the first battery cell and a negative terminal of the second battery cell. The control part may include a switch unit that disconnects the negative output terminal from the battery part when an output voltage of the battery part is less than a discharge reference voltage during a discharging operation or when the output voltage of the battery part is greater than a charging reference voltage during a charging operation.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a view of a table illustrating the operational states of each of the transistor switches for each of when the battery cells are connected in parallel and in series.

DETAILED DESCRIPTION OF THE EMBODIMENTS

Figure 1:
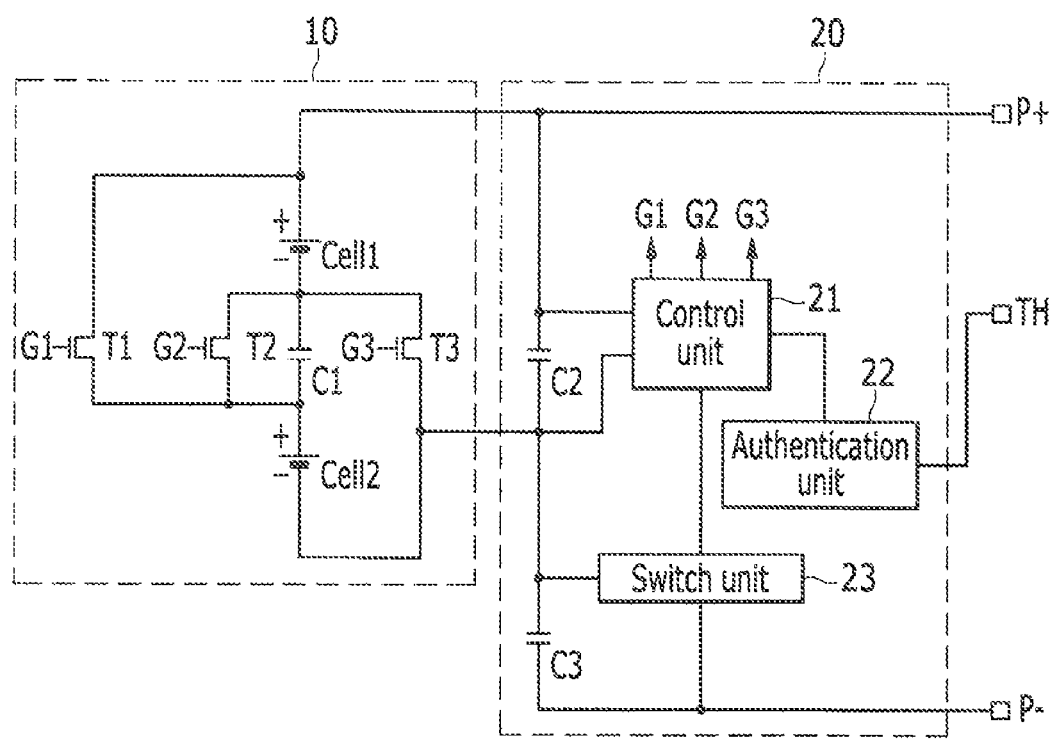
FIG. 1 is a circuit diagram of a battery pack including a plurality of cells according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in the embodiments, like reference numerals designate like elements throughout the specification representatively in a first embodiment, and only elements of embodiments other than those of the first embodiment will be described.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 2:
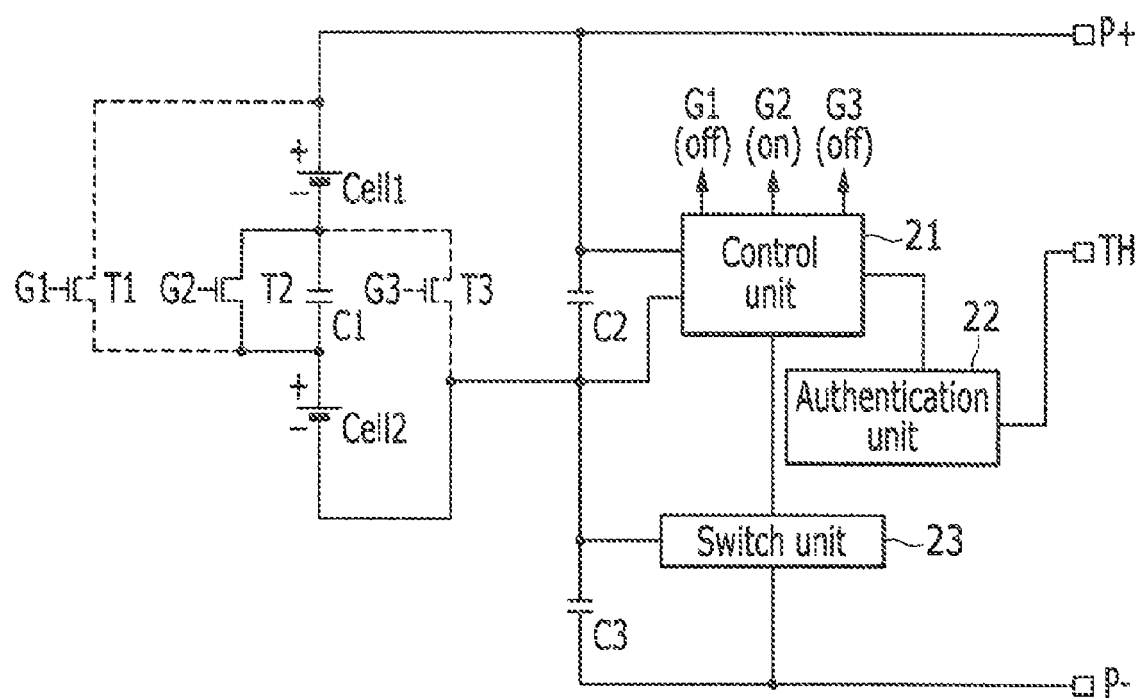
FIG. 2 shows a case in which the plurality of cells are coupled in series in a circuit diagram of a battery pack according to an exemplary embodiment of the present invention.
Figure 3:
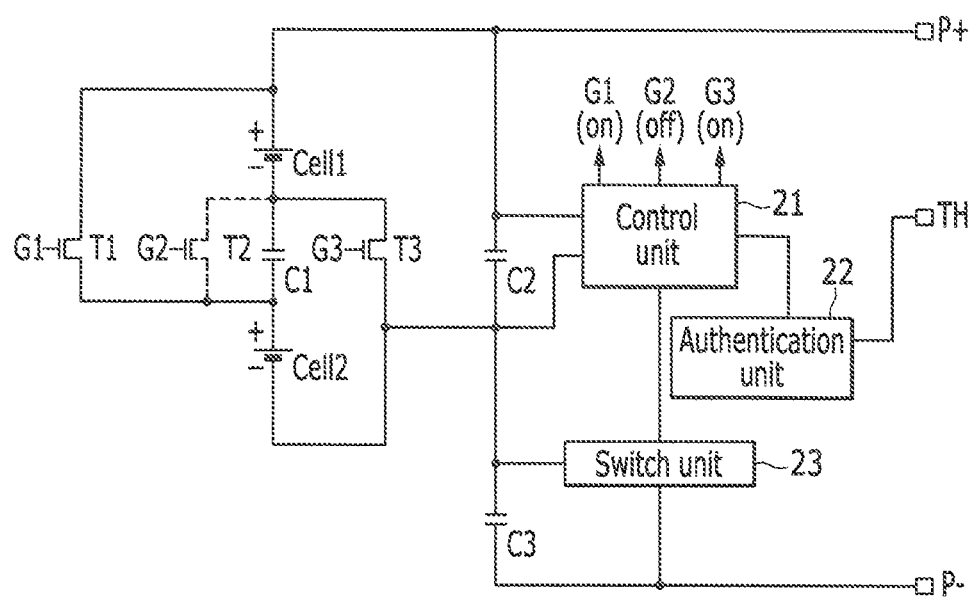
FIG. 3 shows a case in which the plurality of cells are coupled in parallel in a circuit diagram of a battery pack according to an exemplary embodiment of the present invention.

Turning to the figures, FIG. 1 is a circuit diagram of a battery pack according to an exemplary embodiment of the present invention, FIG. 2 shows a case in which a plurality of cells are coupled in series in a circuit diagram of a battery pack according to an exemplary embodiment of the present invention and FIG. 3 shows a case in which a plurality of cells are coupled in parallel in a circuit diagram of a battery pack according to an exemplary embodiment of the present invention.

Referring to FIG. 1, a battery pack includes a battery part 10 and a control part 20. The battery part 10 includes a plurality of rechargeable batteries. The rechargeable batteries (hereinafter referred to as a cell) may be one of a nickel-cadmium battery, a lead-acid battery, a nickel metal hydride battery, a lithium-ion battery, and a lithium polymer battery.

The battery part 10 couples the plurality of cells in series and/or in parallel according to a control of the control part 20. Accordingly, the level of a voltage output from the battery part 10 may be variously changed.

Here, the battery part 10 includes two cells Cell1 and Cell2, a first transistor T1, a second transistor T2, a third transistor T3, and a first capacitor C1. A configuration in which the two cells Cell1 and Cell2 are coupled together in parallel or in series will be described, however the battery part 10 may include more than two cells that can be alternately coupled together in parallel or in series.

A positive electrode (+) of the first cell Cell1 is connected to a positive output terminal (P+). A negative electrode (−) of the second cell Cell2 is connected to a negative output terminal (P−) through a switch unit 23. The first cell Cell1 and the second cell Cell2 are connected to an external device through the positive output terminal (P+) and the negative output terminal (P−) to charge or discharge the external device. The first cell Cell1 and the second cell Cell2 may be a rechargeable battery of the same kind or of a different kind.

The first transistor T1 includes a gate terminal applied with a first gate signal G1, one of the source and drain electrodes of first transistor T1 being connected to the positive electrode (+) of the first cell Cell1, and the other source and drain electrodes of first transistor T1 being connected to the positive electrode (+) of the second cell Cell2. When the first gate signal G1 having a gate-on voltage is applied to the gate terminal of first transistor T1, the first transistor T1 connects the positive electrode (+) of the first cell Cell1 to the positive electrode (+) of the second cell Cell2.

The second transistor T2 includes a gate terminal applied with a second gate signal G2, one of the source and drain electrodes of second transistor T2 being connected to a negative electrode (−) of the first cell Cell1, and the other source and drain electrodes of second transistor T2 being connected to a positive electrode (+) of the second cell Cell2. When the second gate signal G2 having the gate-on voltage is applied to the gate terminal of second transistor T2, the second transistor T2 connects the negative electrode (−) of the first cell Cell1 to the positive electrode (+) of the second cell Cell2.

The third transistor T3 includes a gate terminal applied with a third gate signal G3, one of the source and drain electrodes of third transistor T3 being connected to the negative electrode (−) of the first cell Cell1, and the other source and drain electrodes of third transistor T3 being connected to the negative electrode (−) of the second cell Cell2. When the third gate signal G3 having the gate-on voltage is applied to the gate terminal of third transistor T3, the third transistor T3 connects the negative electrode (−) of the first cell Cell1 to the negative electrode (−) of the second cell Cell2.

The first transistor T1, the second transistor T2, and the third transistor T3 may be p-channel electric field effect transistors (FETs) or n-channel electric FETs. The gate-on voltage turning on the p-channel electric FET is a voltage of a logic low level and a gate-off voltage turning a p-channel FET off is a voltage of a logic high level. The gate-on voltage turning on the n-channel electric FET is a voltage of a logic high level and a gate-off voltage turning a n-channel FET off is a voltage of a logic low level.

The first capacitor C1 includes one terminal connected to the negative electrode ( ) of the first cell Cell1 and the other terminal connected to the positive electrode (+) of the second cell Cell2. The first capacitor C1 serves to float the first cell Cell1 with respect to the second cell Cell2, especially when the first and second cells Cell and Cell2 are connected in parallel as in FIG. 3. The first capacitor C1 may also function to protect the first transistor T1, the second transistor T2, and the third transistor T3 from a reverse voltage or static electricity from an external device. First capacitor C1 can be bypassed by switching on second transistor T2.

The control part 20 includes a second capacitor C2, a third capacitor C3, a control unit 21, an authentication unit 22, and a switch unit 23.

The second capacitor C2 includes one terminal connected to the positive electrode (+) of the first cell Cell1 and the other terminal connected to the negative electrode (−) of the second cell Cell2. The second capacitor C2 is charged with the voltage of the first cell Cell1 and the second cell Cell2. The second Capacitor C2 may function to protect the control unit 21 from the reverse voltage or the static electricity from the external device.

The third capacitor C3 includes one terminal connected to the negative electrode (−) of the second cell Cell2 and the other terminal connected to the negative output terminal (P−). The third capacitor C3 floats the negative electrode (−) of the second cell Cell2 and the output terminal (P−) and can be bypassed selectively by switch unit 23.

The control part 20 has a function of a protection circuit module (PCM) that prevents an overcharge and an over-discharge of the first cell Cell1 and the second cell Cell2 and a battery voltage conversion function coupling the first cell Cell1 and the second cell Cell2 in series and/or in parallel to be adaptive to the operation voltage of the device connected to the output terminals (P+, P−).

Firstly, a constitution of the control unit 21 for the PCM function will be described. The control unit 21 is connected to both terminals of the second capacitor C2. The control unit 21 measures the voltage of both terminals of the second capacitor C2 to measure the voltage of the first cell Cell1 and the second cell Cell2. If the voltage range of the first cell Cell1 and the second cell Cell2 is over a predetermined reference range, the control unit 21 transmits a switch control signal to the switch unit 23.

The switch unit 23 is connected to both terminals of the third capacitor C3. The switch unit 23 connects or disconnects the negative electrode (−) of the second cell Cell2 to and from the negative output terminal (P−) according to the switch control signal transmitted from the control unit 21.

In detail, the control unit 21 compares the measured voltage of the first cell Cell1 and the second cell Cell2 under the charge of the first cell Cell1 and the second cell Cell2 with a charge reference voltage to detect whether the first cell Cell1 and the second cell Cell2 are overcharged. For example, if the voltage of the first cell Cell1 and the second cell Cell2 is higher than the charge reference voltage, the control unit 21 transmits a switch control signal to the switch unit 23 such that the current path through which the battery part 10 and the output terminal (P−) are connected is disconnected.

The charge reference voltage includes the first charge reference voltage used for the series connection of the first cell Cell1 and the second cell Cell2 and the second charge reference voltage used for the parallel connection. That is, when the first cell Cell1 and the second cell Cell2 are coupled in series, the control unit 21 compares the measured charge voltage of the sum of the first and second cells Cell1 and Cell2 to the first charge reference voltage to determine whether the first cell Cell1 and the second cell Cell2 are overcharged. Also, when the first cell Cell1 and the second cell Cell2 are coupled in parallel, the control unit 21 compares the measured charge voltage to the second charge reference voltage to detect whether the first cell Cell1 and the second cell Cell2 are overcharged. The first charge reference voltage is a voltage having a higher level than the second charge reference voltage.

The control unit 21 compares the measured voltage of the first cell Cell1 and the second cell Cell2 under the discharge of the first cell Cell1 and the second cell Cell2 to the discharge reference voltage to detect whether the first cell Cell1 and the second cell Cell2 are over-discharged. For example, if the discharge voltage of the first cell Cell1 and the second cell Cell2 is lower than the discharge reference voltage, the control unit 21 transmits the switch control signal to the switch unit 23 so that the current path through which the battery part 10 and the output terminal (P−) are connected is disconnected.

The discharge reference voltage includes the first discharge reference voltage used upon the series connection of the first cell Cell1 and the second cell Cell2 and the second discharge reference voltage used upon the parallel connection. That is, when the first cell Cell1 and the second cell Cell2 are coupled in series, the control unit 21 compares the measured discharge voltage to the first discharge reference voltage to detect whether the first cell Cell1 and the second cell Cell2 are over-discharged. Also, when the first cell Cell1 and the second cell Cell2 are coupled in parallel, the control unit 21 compares the measured discharge voltage to the second discharge reference voltage to detect whether the first cell Cell1 and the second cell Cell2 are over-discharged. The first discharge reference voltage is a voltage having the higher level than the second discharge reference voltage.

The switch unit 23 may include an electric FET connecting and disconnecting the negative electrode (−) of the second cell Cell2 to and from the output terminal (P−) according to the switch control signal transmitted from the control unit 21. The switch unit 23 may include the first electric FET connecting or disconnecting the charge current under the charge and the second electric FET connecting or disconnecting the discharge current under the discharge.

Also, the switch unit 23 may include a thermistor connecting or disconnecting the charge current and the discharge current between the negative electrode (−) of the second cell Cell2 and the output terminal (P−) according to the switch control signal transmitted from the control unit 21. The thermistor may be one of a negative temperature coefficient thermistor and a positive temperature coefficient thermistor.

Next, the constitution of the control part 20 to execute the battery voltage conversion function will be described.

The authentication unit 22 measures a unique resistance of a device connected to a unique resistance terminal TH. The unique resistance of the connected device represents a voltage (hereinafter, an operation voltage) that is used by the corresponding device. The authentication unit 22 recognizes the usage of the connected device by using the measured unique resistance. The authentication unit 22 transmits the voltage signal containing the operation voltage of the connected device to the control unit 21.

The control unit 21 generates a first gate signal G1, a second gate signal G2, and a third gate signal G3 to the first transistor T1, second transistor T2 and third transistor T3 respectively to couple the first cell Cell1 and the second cell Cell2 either in series or in parallel according to the voltage signal transmitted from the authentication unit 22.

Turning now to FIG. 2, FIG. 2 shows a case in which the first cell Cell1 and the second cell Cell2 are coupled in series. Referring to FIG. 2, under the series connection of the first cell Cell1 and the second cell Cell2, the control unit 21 generates the second gate signal G2 as the gate-on voltage, and the first gate signal G1 and the third gate signal G3 as the gate-off voltage. Accordingly, the second transistor T2 is turned on, and the first transistor T1 and the third transistor T3 are turned off. According to the turn-on of the second transistor T2, capacitor C1 is bypassed so that the negative electrode (−) of the first cell Cell1 and the positive electrode (+) of the second cell Cell2 are connected together so that the first cell Cell1 and the second cell Cell2 are coupled in series.

Turning now to FIG. 3, FIG. 3 shows a case in which the first cell Cell1 and the second cell Cell2 are coupled in parallel. Referring to FIG. 3, under the parallel connection of the first cell Cell1 and the second cell Cell2, the control unit 21 generates the first gate signal G1 and the third gate signal G3 as the gate-on voltage, and the second gate signal G2 as the gate-off voltage. Accordingly, the first transistor T1 and the third transistor T3 are turned on and the second transistor T2 is turned off. According to the turn on of the first transistor T1, the positive electrode (+) of the first cell Cell1 and the positive electrode (+) of the second cell Cell2 are connected. According to the turn-on of the third transistor T3, the negative electrode (−) of the first cell Cell1 and the negative electrode (−) of the second cell Cell2 are connected. As a result, the first cell Cell1 and the second cell Cell2 are coupled in parallel.

Turning now to FIG. 4, FIG. 4 shows in tabular form the state of the transistors T1, T2 and T3 for each of when Cell1 and Cell2 are connected in parallel and in series.

As described above, the provided battery pack recognizes the operation voltage of the corresponding device by using the unique resistance of the connected device sensed through a third terminal TH on the battery pack, and the discharge voltage may be changed to be adaptive to the operation voltage of the corresponding device. Accordingly, the provided battery pack may be used for various devices using voltages of different levels. With such an arrangement, the battery pack can be sold separately to a consumer and not an original equipment manufacturer (OEM) so that the battery pack can be used in many different devices to power many different electrical appliances. Then, the consumer can connect the 3-terminal battery pack to the three terminal electrical appliance to produce a battery pack arrangement.

Figure 5:
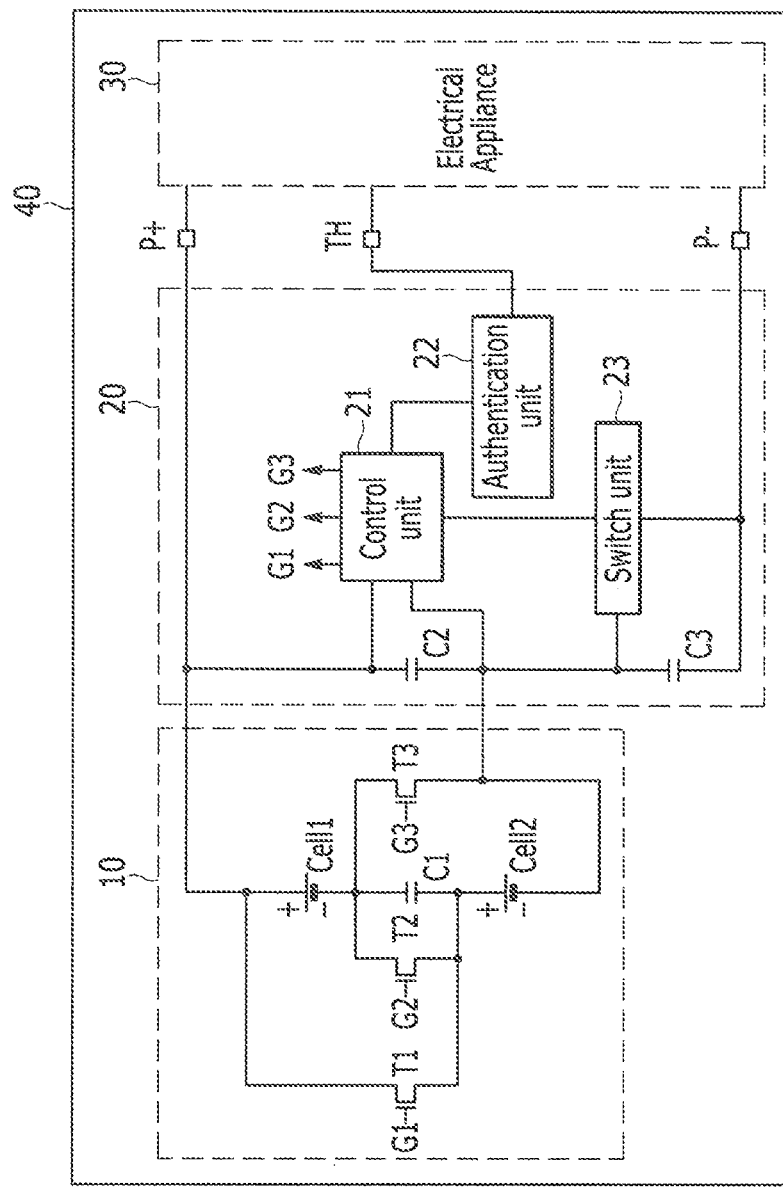
FIG. 5 is a view of an electrical apparatus that includes the battery pack within according to an embodiment of the present invention.

The battery pack of the present invention can instead be incorporated into a chassis 40 of an electronic apparatus to power an electrical appliance 30 within the chassis 40 as in FIG. 5. The arrangement of FIG. 5 allows many different OEMs to manufacture many different electronic apparatuses with many different electrical appliances within and having varying voltage requirements, while using a same battery pack therein. In such a scenario, the battery pack is sold to OEMs to produce many different electronic apparatuses, so that one battery pack can be mass produced and sold to many different OEMs for use in varying electronic apparatuses.

The drawings and the detailed description of the invention given so far are only illustrative, and they are only used to describe the present invention but are not used to limit the meaning or restrict the range of the present invention described in the claims. Therefore, it will be appreciated to those skilled in the art that various modifications may be made and other equivalent embodiments are available. Accordingly, the actual scope of the present invention must be determined by the spirit of the appended claims.

DESCRIPTION OF SYMBOLS

10: battery part
20: control part
21: control unit
22: authentication unit
23: switch unit
30: electrical appliance
40: chassis

What is claimed is:

1. A battery pack arrangement, comprising:
a battery pack; and
an electrical appliance powered by the battery pack and being connected to the battery pack via positive, negative and unique resistance terminals on the battery pack, the battery pack including:
a battery part including a plurality of battery cells and a plurality of switches, the plurality of switches varying an output voltage applied to the electrical appliance across the positive and negative terminals; and
a control part connected to the battery part and to the electrical appliance, the control part determining the output voltage used by the electrical appliance based on a unique resistance voltage of the unique resistance terminal and electrically connecting the plurality of battery cells in one of parallel and series by controlling the switches based on the unique resistance voltage.

2. The battery pack arrangement of claim 1, wherein each of the switches is a transistor, the control part connecting the battery cells in one of series and parallel by sending control signals to each of the transistors.

3. The battery pack arrangement of claim 2, each of the transistors being a field effect transistor, the control signals being sent to a gate of each of the transistors.

4. The battery pack arrangement of claim 1, the battery part being composed of two battery cells and three switches.

5. The battery pack arrangement of claim 4, each of the two battery cells being electrically isolated from each other by at least one capacitor.

6. The battery pack arrangement of claim 1, the control part comprising a control unit connected to each of the switches to control each of the switches.

7. The battery pack arrangement of claim 6, the control unit also being connected between a positive terminal of a first battery cell and a negative terminal of a second battery cell.

8. The battery pack arrangement of claim 1, the control part comprising a switch unit for selectively connecting the battery part to the negative terminal based on whether the battery part is overcharged or overdischarged.

9. The battery pack arrangement of claim 1, the electrical appliance being one of a charging device and an electrical apparatus powered by the battery pack.

10. The battery pack arrangement of claim 1, the control part comprising a switch unit that disconnects the negative terminal from the battery part when an output voltage of the battery part is less than a discharge reference voltage during a discharging operation or when the output voltage of the battery part is greater than a charging reference voltage during a charging operation.

11. A battery pack, comprising:
a positive output terminal, a negative output terminal and a unique resistance terminal exposed to an outside;
a battery part including a plurality of battery cells and a plurality of switches; and
a control part connected to the battery part electrically connecting the plurality of battery cells in one of parallel and series by controlling the switches based upon a unique resistance voltage sensed at the unique resistance terminal.

12. The battery pack of claim 11, wherein the plurality of switches comprise:
a first transistor connected between a positive terminal of a first battery cell and a positive terminal of a second battery cell;
a second transistor connected between a negative terminal of the first battery cell and the positive terminal of the second battery cell; and
a third transistor connected between the negative terminal of the first battery cell and a negative terminal of the second battery cell.

13. The battery pack of claim 11, further comprising a capacitor arranged in parallel with one of the switches and connected between a negative terminal of one of the battery cells and a positive terminal of another of the battery cells.

14. The battery pack of claim 11, further comprising a capacitor connected between a positive terminal of a one of the battery cells and a negative terminal of another of the battery cells.

15. The battery pack of claim 11, further comprising a capacitor connected between the battery part and the negative output terminal.

16. An electronic apparatus, comprising:
a chassis;
an electrical appliance arranged within the chassis;
a battery pack arranged within the chassis, the electrical appliance being connected to the battery pack via a positive output terminal, a negative output terminal and an unique resistance terminal arranged on the battery pack, the battery pack including:
a battery part including a plurality of battery cells and a plurality of switches; and
a control part connected to the battery part for electrically connecting the plurality of battery cells in one of parallel and series by controlling the switches based upon a unique resistance voltage sensed by the unique resistance terminal.

17. The electronic apparatus of claim 16, the electrical appliance being powered by the battery pack.

18. The electronic apparatus of claim 16, the plurality of battery cells comprising a first battery cell and a second battery cell, the plurality of switches comprising a first switch, a second switch and a third switch.

19. The electronic apparatus of claim 16, wherein the plurality of switches comprise:
a first transistor connected between a positive terminal of a first battery cell and a positive terminal of a second battery cell;
a second transistor connected between a negative terminal of the first battery cell and the positive terminal of the second battery cell; and
a third transistor connected between the negative terminal of the first battery cell and a negative terminal of the second battery cell.

20. The electronic apparatus of claim 16, the control part comprising a switch unit that disconnects the negative output terminal from the battery part when an output voltage of the battery part is less than a discharge reference voltage during a discharging operation or when the output voltage of the battery part is greater than a charging reference voltage during a charging operation.

* * * * *